(12) United States Patent
Han

(10) Patent No.: US 12,442,356 B2
(45) Date of Patent: Oct. 14, 2025

(54) VERTICAL AXIS MULTI-STAGE WIND TURBINE GENERATOR

(71) Applicant: Kyung Hee Han, Yonginsi (KR)

(72) Inventor: Kyung Hee Han, Yonginsi (KR)

( * ) Notice: Subject to any disclaimer, the term of this patent is extended or adjusted under 35 U.S.C. 154(b) by 0 days.

(21) Appl. No.: 18/517,346

(22) Filed: Nov. 22, 2023

(65) Prior Publication Data

US 2024/0167452 A1 May 23, 2024

(30) Foreign Application Priority Data

Nov. 23, 2022 (KR) .................. 10-2022-0158093

(51) Int. Cl.
*F03D 3/00* (2006.01)
*F03D 3/06* (2006.01)
*F03D 9/25* (2016.01)
*F03D 13/20* (2016.01)
*F03D 13/25* (2016.01)

(52) U.S. Cl.
CPC ............. *F03D 3/005* (2013.01); *F03D 3/062* (2013.01); *F03D 9/25* (2016.05); *F03D 13/2005* (2023.08); *F03D 13/256* (2023.08); *F05B 2240/93* (2013.01)

(58) Field of Classification Search
CPC . F03D 3/005; F03D 3/062; F03D 9/25; F03D 13/256; F03D 13/2005
See application file for complete search history.

(56) References Cited

U.S. PATENT DOCUMENTS

| | | | | |
|---|---|---|---|---|
| 7,329,965 B2* | 2/2008 | Roberts | .................. | F03D 13/20 290/55 |
| 7,696,635 B2* | 4/2010 | Boone | ..................... | F03D 3/067 290/55 |
| 7,944,075 B2* | 5/2011 | Boone | ..................... | F03D 3/062 417/334 |
| 7,960,852 B2* | 6/2011 | Cumings | ............... | F03D 3/0481 290/55 |
| 8,164,210 B2* | 4/2012 | Boone | ..................... | F03D 3/005 290/55 |
| 8,604,635 B2* | 12/2013 | Boone | ..................... | F03D 15/10 290/55 |
| 8,786,122 B2* | 7/2014 | Rajadhyaksha | ....... | F03B 17/063 290/53 |
| 9,024,463 B2* | 5/2015 | Boone | ...................... | F03D 9/28 290/55 |
| 10,047,724 B2* | 8/2018 | Kisovec | ................... | H02K 3/26 |
| 2007/0296219 A1* | 12/2007 | Nica | ....................... | F03D 3/061 290/55 |
| 2008/0217924 A1* | 9/2008 | Boone | ..................... | F03D 3/067 290/55 |
| 2008/0217925 A1* | 9/2008 | Boone | ..................... | F03D 13/20 290/55 |

(Continued)

*Primary Examiner* — Tulsidas C Patel
*Assistant Examiner* — Thomas K Quigley
(74) *Attorney, Agent, or Firm* — Park & Associates IP Law Office

(57) ABSTRACT

The present invention relates to a vertical axis multi-stage wind turbine generator in which multiple stages are provided in a vertical axis to construct a plurality of power generating devices in one power generation facility so that backwind power is enhanced to the maximum, and headwind power is minimized to achieve an economical and efficient power generation function.

2 Claims, 17 Drawing Sheets

(56) References Cited

U.S. PATENT DOCUMENTS

| | | | |
|---|---|---|---|
| 2009/0066090 A1* | 3/2009 | Boone | F03D 3/062 290/55 |
| 2009/0191057 A1* | 7/2009 | Knutson | F03D 3/02 290/55 |
| 2009/0284018 A1* | 11/2009 | Ellis | F03D 3/005 290/55 |
| 2010/0032954 A1* | 2/2010 | Law | F03D 3/02 290/55 |
| 2010/0045039 A1* | 2/2010 | Stroup | H02P 9/04 290/55 |
| 2010/0213722 A1* | 8/2010 | Scott | F03D 3/0409 290/55 |
| 2012/0148403 A1* | 6/2012 | Flaherty | F03D 3/02 290/55 |
| 2012/0175883 A1* | 7/2012 | Nica | F03D 3/0409 290/55 |
| 2012/0211992 A1* | 8/2012 | Boone | F03D 13/20 290/55 |
| 2013/0001950 A1* | 1/2013 | Armstrong | F03D 9/25 290/55 |
| 2013/0026761 A1* | 1/2013 | Rajadhyaksha | F03B 17/062 416/128 |
| 2013/0026762 A1* | 1/2013 | Rajadhyaksha | F03B 17/063 290/54 |
| 2013/0119672 A1* | 5/2013 | Boone | F03D 15/10 290/55 |
| 2014/0077504 A1* | 3/2014 | Epstein | F03D 80/70 290/55 |
| 2014/0375060 A1* | 12/2014 | Lin | F03D 3/0409 290/55 |
| 2015/0211485 A1* | 7/2015 | Tortorello | F03D 3/068 416/147 |
| 2015/0369216 A1* | 12/2015 | Kisovec | H02K 1/2795 290/55 |

* cited by examiner

VERTICAL AXIS MULTI-STAGE WIND TURBINE GENERATOR

CROSS-REFERENCE TO RELATED APPLICATIONS

This U.S. non-provisional patent application claims priority under 35 U.S.C. § 119 of Korean Patent Application No. 10-2022-0158093, filed on Nov. 23, 2022, the entire contents of which are hereby incorporated by reference.

BACKGROUND

The present invention relates to a wind turbine generator, and more particularly, to a vertical axis multi-stage wind turbine generator which is capable of reducing a counter-torque wind pressure applied to a rotor blade and in which a plurality of wind power generating devices, which independently perform wind power generation, in one tower-type structure, are installed.

Wind turbine generators are devices that convert energy possessed by wind into electrical energy useful to us. The blowing wind spins blades of the wind turbine generators. This generated torque of the blades is used to produce electricity.

Specifically, a wind turbine generator includes three parts that are a blade, a transmission device, and a generator. The blade is a device that is rotated by wind to convert wind power energy into mechanical energy, the transmission device rotates the generator in such a way that the torque generated from the blade is transferred to a speed-change gear through a central rotary shaft to increase revolutions to revolutions required by the generator, and the generator is a device that converts the mechanical energy generated from the blade into electrical energy.

As the higher a wind speed is and the larger a windmill is, the more the wind turbine generator can produce wind power energy, an amount of power generation of the wind turbine generator is dependent on the strength of the wind and the size of the windmill. In addition, since the wind blows harder as the height increases, a generator at a higher position has a greater size and a greater amount of power generation than a generator at a lower position. The power generation using wind power requires the wind that blows at an average speed of about 4 m/s or higher. The speed of the wind used herein refers to a speed at a height, at which the blade of the wind turbine generator is disposed, but not the ground on which we stand.

This wind turbine generator, which uses a power generation method using kinetic energy of the wind, has very significant effects of replacing fossil fuel, can supply economic electrical power to areas such as remote islands, in which electricity supply is underdeveloped, and can be installed in coastal areas and mountainous areas, to which a significant amount of wind is applied, to rationalize national land use.

The wind turbine generator is classified as a "horizontal axis wind turbine generator" if a rotary shaft is parallel to the ground in a direction in which the wind blows, and as a "vertical axis wind turbine generator" if a rotary shaft is perpendicular to the ground.

The horizontal axis wind turbine generator, which is one of the most common generators, refers to a propeller type in which three or four blades are formed on one pillar, and is simple in structure, easy in installation, and excellent in energy conversion efficiency. However, the horizontal axis wind turbine generator requires a yaw device for adjustment according to the direction of the wind, has concerns about noise generation and breakage due to a large rotational radius of each of the blades and the big blades, and is difficult to inspect and maintain as a heavy nacelle is installed on an upper portion of a tower.

The vertical axis wind turbine generator is not affected by the direction of the wind, and power generating devices may be installed as a multi-stage type. However, the vertical axis wind turbine generator has relatively lower power generation efficiency than the horizontal axis wind turbine generator.

The reason why the vertical axis wind turbine generator has the lower power generation efficiency than the horizontal axis wind turbine generator despite the expectation that the vertical axis wind turbine generator would have high power generation efficiency as not being affected by the direction of the wind as above is a counter-torque wind pressure that is inevitably applied to a rotor blade attached to a vertical shaft while the rotor blade rotates around a stationary shaft.

PRIOR ART DOCUMENTS

Patent Documents

Korean Patent Registration No. 10-2448925
Korean Patent Registration No. 10-1498785
Korean Patent Registration No. 10-1483461
Korean Patent Registration No. 10-1554307
Korean Patent Registration No. 10-1325752
Korean Patent Registration No. 10-1722659

SUMMARY

The present invention is intended to solve the above limitations, and an object of the present invention is to provide to a vertical axis multi-stage wind turbine generator which significantly reduces a counter-torque wind pressure applied to a rotor blade while the rotor blade rotates in a direction opposing wind, and which is structurally stable enough to withstand strong wind even when independent wind power generating devices are installed vertically in multiple stages.

An object of the present invention for solving above limitations is to provide a vertical axis multi-stage wind turbine generator in which a rotary shaft is perpendicular to the ground in a direction in which wind blows, the vertical axis wind turbine generator being characterized by including four poles 220 built on the ground, a plurality of wind guide plates 210, which are fixed at fixed intervals in a state in which each of the four poles 220 passes through a pole hole 210b defined in an outer circumference of each of the wind guide plates, a stationary shaft 110, which is disposed between two wind guide plates and vertically connected at a center of each of the two wind guide plates, a rotary shaft 120 rotatably shaft-coupled to the stationary shaft, at least two rotor blades 130 coupled to the rotary shaft, a wind hole 140 defined in each of the rotor blades, a ball net 150, which is coupled to the wind hole and has a cylindrical shape that has both ends each protruding to have a hemispherical shape and is empty, and in which a protruding portion of one of the hemispherical shapes protrudes in one direction of the wind hole, and a protruding portion of the other hemispherical shape protrudes in the other direction of the wind hole, a wind hole opening/closing ball 160 which is provided in the ball net and has the same radius as a radius of the protruding portion of the hemispherical shape, and slides in the ball net when a wind pressure acts, so as to open and close the wind hole according to a position of the rotor blade that rotates when the wind blows, and a power generating device M engaged with the rotary shaft to produce electricity.

Provided is a vertical axis multi-stage wind turbine generator characterized by including a pole 220, which is provided in at least three to be coupled to an outer circumference of the wind guide plate so that the pole reinforces a structure to withstand even a relatively high wind pressure, a plurality of rotary shafts 120, each of which is rotatably shaft-coupled to the stationary shaft, a rotor blade 130, which provided in at least two to be coupled to the rotary shaft and is disposed between the wind guide plate and the wind guide plate, and a power generating device M engaged with the rotary shaft to produce electricity.

Provided is also a vertical axis multi-stage wind turbine generator characterized by including a stationary shaft 110 built on the ground, a wind guide plate 210, which has a cone shape and is provided as a multi-stage type on the stationary shaft, a pole 220, which is built on the ground to be spaced a fixed distance from the stationary shaft, and is provided in at least three to be coupled to an outer circumference of the wind guide plate so that the pole reinforces a structure to withstand even a relatively high wind pressure, a plurality of rotary shafts 120, each of which is rotatably shaft-coupled to the stationary shaft, a rotor blade 130, which is provided in at least two to be coupled to the rotary shaft and is disposed between the wind guide plate and the wind guide plate, a wind hole 140 defined in each of the rotor blades, a ball net 150, which is coupled to the wind hole and has a cylindrical shape that has both ends each protruding to have a hemispherical shape and is empty, and in which a protruding portion of one of the hemispherical shapes protrudes in one direction of the wind hole, and a protruding portion of the other hemispherical shape protrudes in the other direction of the wind hole, a wind hole opening/closing ball 160, which is provided in the ball net and has the same radius as a radius of the protruding portion of the hemispherical shape, and slides in the ball net when a wind pressure acts, so as to open and close the wind hole according to a position of the rotor blade that rotates when the wind blows, and a power generating device M engaged with the rotary shaft to produce electricity.

In addition, the vertical axis multi-stage wind turbine generator is characterized in that the wind hole 140 has a circular or quadrangular shape, and one side surface of the wind hole is provided with a wind hole opening/closing door 250 that has a quadrangular shape and is selectively opened or closed according to the position of the rotor blade when the wind pressure acts. The vertical axis multi-stage wind turbine generator is characterized in that the wind hole 140 has a quadrangular shape and each of both side surfaces of the wind hole is provided with a wind hole opening/closing door 250 is selectively opened or closed according to the position of the rotor blade when the wind pressure acts. The vertical axis multi-stage wind turbine generator is characterized in that a wind hole 140 having a quadrangular shape is defined in the rotor blade 130, a plate net 260 having a hexahedral shape is provided in the wind hole, a pair of plate guide rails 270 are provided on each of inner upper and lower sides of the plate net 260, and a wind hole opening/closing plate 280 in which a guide groove 282 fitted into each of the plate guide rails is defined is coupled to the plate guide rails to be slidable forward and backward so that the wind hole opening/closing plate selectively opens or closes the wind hole while moving forward and backward along the plate guide rail according to the position of the rotor blade when the wind pressure acts.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, the present invention will be described in detail with reference to the accompanying drawings.

Figure 1:
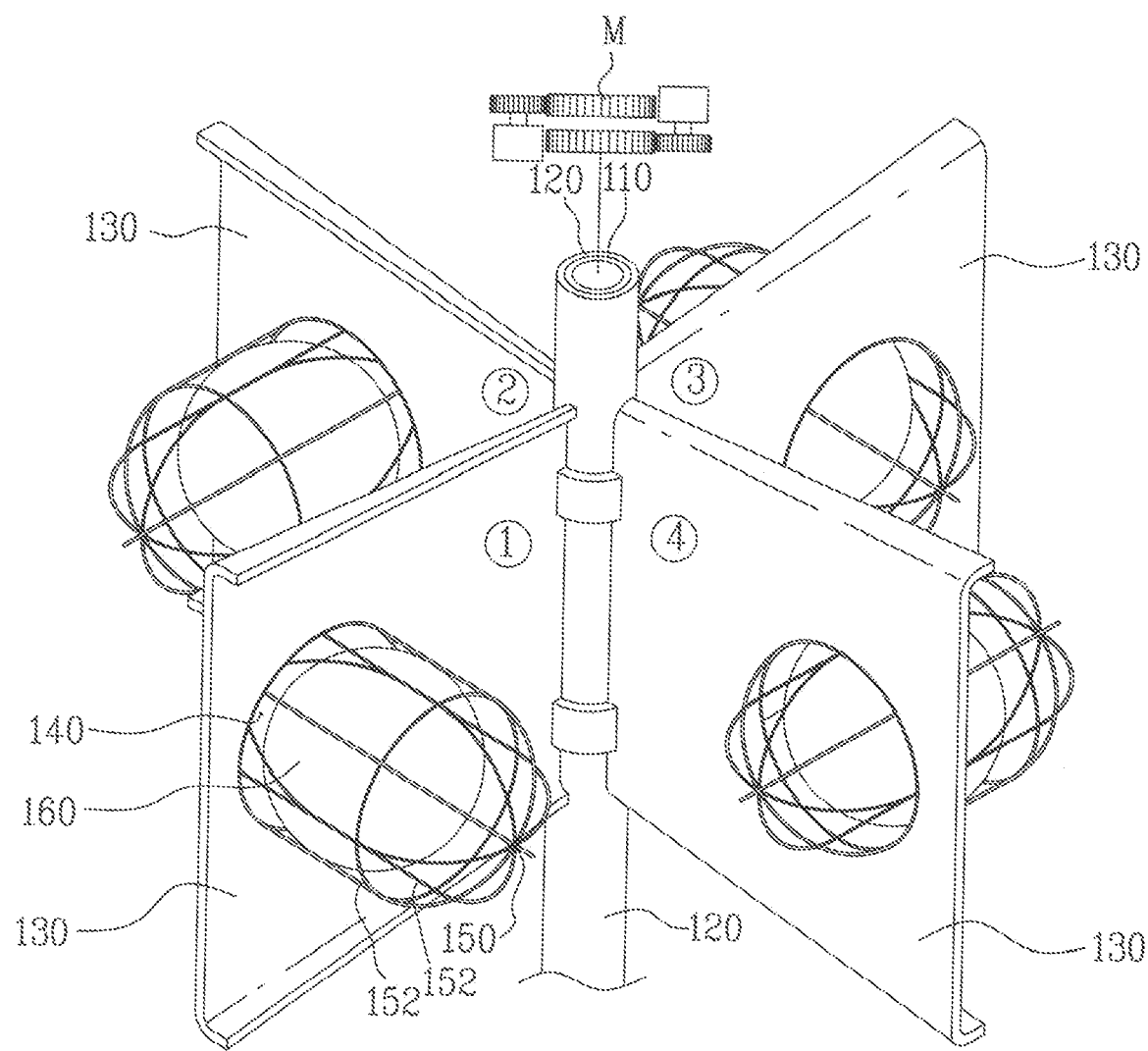
FIG. 1 illustrates a rotor blade of a vertical axis wind turbine generator connected to a rotary shaft according to a first embodiment of a first scheme of the present invention.
Figure 2:
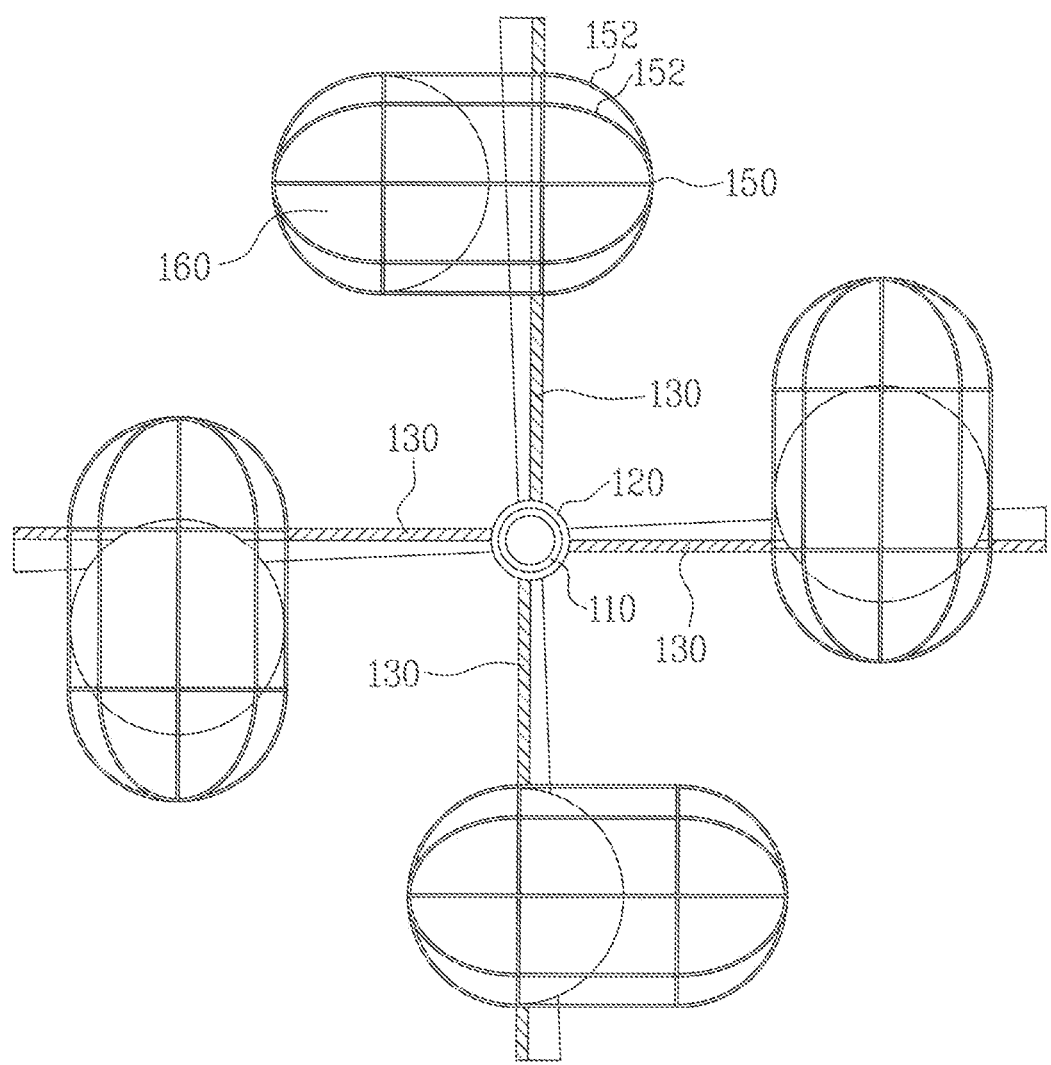
FIG. 2 is a plan view of the rotor blade of the vertical axis wind turbine generator connected to the rotary shaft according to the first embodiment of the first scheme of the present invention.

As illustrated in FIGS. 1 and 2, a stationary shaft 110 built to be perpendicular to the ground is provided.

A rotary shaft 120 that rotates around the stationary shaft is couple to the stationary shaft 110. Four rotor blades 130 having the same size and shape are coupled to the rotary shaft 120 at an interval of 90°. Each of the rotor blades 130 has a trapezoid shape in which a width thereof gradually increases from a portion coupled to the rotary shaft 120 toward an end. This is intended to increase torque of the rotary shaft 120 when a wind pressure is applied to the rotor blade.

When the wind pressure is applied to the rotor blade 130, the torque gradually increases in a direction that is away from the rotary shaft 120. Thus, the rotor blade 130 is provided to have an outer side having a greater width than an inner side thereof in order for a portion on which more torque acts to have a greater surface area.

In addition, a certain portion of each of both an upper end and a lower end and an outer vertical end of the rotor blade 130 is provided to be bent inwardly. This allows the wind to be collected without slipping when the wind pressure acts on the rotor blade 130, and reinforces a structure so that the rotor blade is prevented from being bent or deformed when a strong wind pressure is applied thereto.

A wind hole 140 having a large circular shape is defined in the rotor blade 130. The wind hole 140 is defined in the same position of each of the four rotor blades 130. The wind hole 140 is provided to be a little biased from a center of the rotor blade toward the outside so that when a ball net frame to be described later is provided, the wind hole 140 and the ball net frame do not interfere with each other.

In the rotor blade, one wind hole 140 having a relatively large size may be defined, or a plurality of wind holes 140 each having a relatively small size may be defined.

The wind hole 140 is provided with a ball net 150. The ball net 150 is provided by arranging a plurality of ball net frames 152 such as wires, in the form of a cylinder, and bending both ends of each of the ball net frames 152 in the form of a hemisphere to be connected to each other. A point, at which a hemispherical portion and a cylindrical portion are in contact with each other, of the ball net 150 is provided to be fixed to the wind hole 140. Thus, only the hemispherical portion of the ball net 150 protrudes in one direction of the wind hole 140, and the other portion protrudes in an opposite direction.

A wind hole opening/closing ball 160 having a diameter, which is about 0 mm to about 2 mm shorter than a radius of the hemispherical portion, is inserted into the ball net 150. The wind hole opening/closing ball 160 may be pre-inserted into the ball net 150 when the ball net 150 is manufactured. Alternatively, the wind hole opening/closing ball 160 may be made like a football so as to be inflated with air or deflated, and then manufactured by inserting into the deflated wind hole opening/closing ball 160 into a space between the ball net frames 152 after the manufacture of the ball net 150, and then inflating the wind hole opening/closing ball 160 with air to provide the wind hole opening/closing ball 160 having a spherical shape.

A power generating device M is provided on one side of the stationary shaft 110, and the rotary shaft 120 and the power generating device M are engaged with each other so that power generation is performed when the rotary shaft 120 rotates.

Operations of the wind turbine generator according to the first embodiment of the first scheme of the present invention configured as described above will be described as follows.

As illustrated in FIG. 1, the rotary shaft 120 is designed to rotate only in a clockwise direction when wind blows in a direction perpendicularly crossing horizontal surfaces of the rotor blades ① and ③. Accordingly, the wind pressure concentratively acts on the rotor blades ① and ③ of the rotor blades 130 perpendicularly crossing the direction of the wind, and the wind pressure hardly acts on the rotor blades ② and ④ of the rotor blades 130 parallel to the direction of the wind.

When the same wind pressure acts on the rotor blades ① and ③ of the rotor blades 130, the rotor blades ① and ③ do not theoretically rotate. However, as the respective portions of both the upper and lower ends and the outer vertical end of the rotor blade 130 are bent inwardly so as to collect the wind, the rotor blades 130 rotate in the clockwise direction.

When the wind pressure acts on the rotor blade ①, the wind hole opening/closing ball 160 in the ball net 150 slides to the front along the ball net frame 152 of the ball net 150 to close the wind hole 140. As the radius of the hemispherical portion of the ball net 150 is set to be the same as the radius of the wind hole opening/closing ball 160, an outer surface of the wind hole opening/closing ball 160 is in close contact with the hemispherical portion of the ball net 150, and the wind hole 140 is completely closed.

As it occurs in an instant for the wind hole opening/closing ball 160 to move along the ball net frame 152 of the ball net 150 and close the wind hole 140, immediately when the wind pressure acts, the wind hole opening/closing ball 160 moves along the ball net frame 152 to close the wind hole 140.

When the wind hole 140 is closed, the wind pressure having approximately the same magnitude as that when the wind hole 140 is not defined is applied to the rotor blade 130.

When the wind pressure acts on the rotor blade ③ of the rotor blades 130, the wind hole opening/closing ball 160 in the ball net 150 moves to the front along the ball net frame 152 of the ball net 150 so that the wind hole 140 is opened. Even though the wind hole opening/closing ball 160 closes the wind hole 140, when the wind pressure acts on the ball net 150, the wind hole opening/closing ball 160 moves along the ball net frame 152 of the ball net 150 to the hemispherical portion in an opposite direction. That is, the wind pressure acting on the rotor blade ③ of the rotor blades 130 is relatively decreased due to the opened wind hole 140. The wind pressure acts as less as an area of the wind hole 140. Thus, as the size of the wind hole 140 increases, the wind pressure acts on the rotor blade ③ of the rotor blades 130 decreases.

Here, the wind pressure acts on the rotor blade ③ of the rotor blades 130 in a direction opposite to a direction of all of the rotor blades 130 rotating in the clockwise direction, and thus is a main factor to decrease a rotation speed of the rotor blades 130. Thus, as the wind pressure acts as less as the area of the wind hole 140, the entire rotation speed of the rotor blades 130 is relatively decreased. That is, the greater a difference in magnitude between the wind pressure acting on the rotor blade ① of the rotor blades 130 and the wind pressure acting on the rotor blade ③ of the rotor blades 130 is, the higher the entire rotation speed of the rotor blades is.

When the wind blows in a direction perpendicularly crossing horizontal surfaces of the rotor blades ① and ③ of the rotor blades 130, the wind pressure is applied in a direction parallel to the direction of the wind, and thus the wind pressure hardly acts on the rotor blade ② of the rotor blades 130 and the rotor blade ④ of the rotor blades 130. When the wind blows as above, the rotor blade ① forms an angle of about 90°, the rotor blade ② forms an angle of about 0°, the rotor blade ③ forms an angle of about 90°, and the rotor blade ④ forms an angle of about 0° with respect to the direction of the wind. That is, each of the rotor blades 130 is always disposed at an angle of about 0° to about 90° with respect to the direction of the wind.

As the rotor blade is set to rotate in the clockwise direction, the rotor blade 130 disposed at a left surface of each of the rotor blades ② and ④ of the rotor blades 130, which are parallel to the direction of the wind, is properly functional in the rotation of the rotary shaft 120, and the rotor blade 130 disposed at a right surface thereof is adversely functional.

However, in a case in which the wind blows in a direction perpendicularly crossing the horizontal surfaces of the rotor blades ① and ③ of the rotor blades 130, when the rotor blade 130 is disclosed at the left surface on the basis of the direction of the wind, the wind hole opening/closing ball 160 maintains a state of closing the wind hole 140, and when the rotor blade 130 is disclosed at the right surface, the wind hole 140 is in an opened state. Thus, when the rotor blade 130 is disposed at a position of being properly functional in the rotation of the rotary shaft 120, the wind hole 140 is closed, and when the rotor blade 130 is disposed at a position of being adversely functional in the rotation of the rotary shaft 120, the wind hole 140 is opened. Accordingly, the rotation speed of the rotor blade 130 is less reduced compared to when the wind hole 140 is not defined.

Although the rotor blade ①, the rotor blade ②, the rotor blade ③, and the rotor blade ④ are distinguished for explanation, when the wind actually blows, each of the rotor blades 130 rotates in a circle to be lost in directional characteristics. Even when the wind flows from any directions, the same principle applies to the four rotor blades 130 so that the wind hole 140 of the rotor blade 130 disposed at the position of being properly functional in the rotation of the rotary shaft 120 is closed, and the wind hole 140 of the rotor blade 130 disposed at the position of being adversely functional is opened. Accordingly, the rotation speed of the rotary shaft 120 may be greatly increased compared to when the wind hole 140 is not defined.

When the rotation speed of the rotary shaft 120 is increased, the efficiency of the power generating device M which is connected to the rotary shaft 120 and includes a rotor and a stator, is increased.

Figure 3:
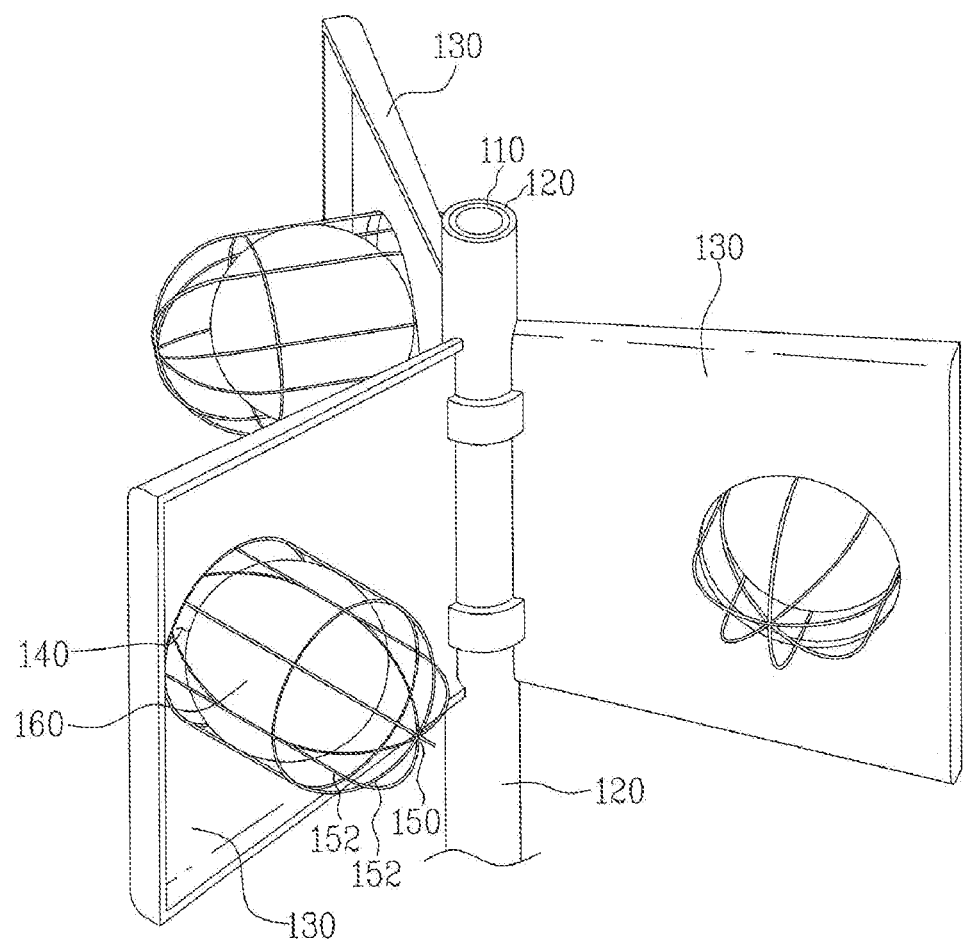
FIG. 3 illustrates a rotor blade of a vertical axis wind turbine generator connected to a rotary shaft according to a second embodiment of the first scheme of the present invention.

In FIG. 3, as a second embodiment of the first scheme of the present invention, a rotor blade is provided in three unlike the first embodiment of the first scheme of the present invention. However, when a rotor blade 130 is disposed at a left surface on the basis of a direction of wind, a wind hole opening/closing ball 160 maintains a state of closing a wind hole 140, and when the rotor blade 130 is disclosed at the right surface, the wind hole 140 is in an opened state. That is, regardless the number of the rotor blades 130, the wind hole 140 of the rotor blade 130 disposed at a position at which the rotary shaft 120 is accelerated is closed, and the wind hole 140 of the rotor blade 130 disposed at a position at which the rotary shaft 120 is decelerated is opened. Accordingly, the rotary shaft 120 is relatively faster rotated compared to when the wind hole 140 is not defined. As above, the rotor blades 130 may be provided in two, three, or more, but when the wind hole 140 is defined, the same principle as applied to the first embodiment applies.

A third embodiment of the first scheme of the present invention will be described as follows.

Figure 4:
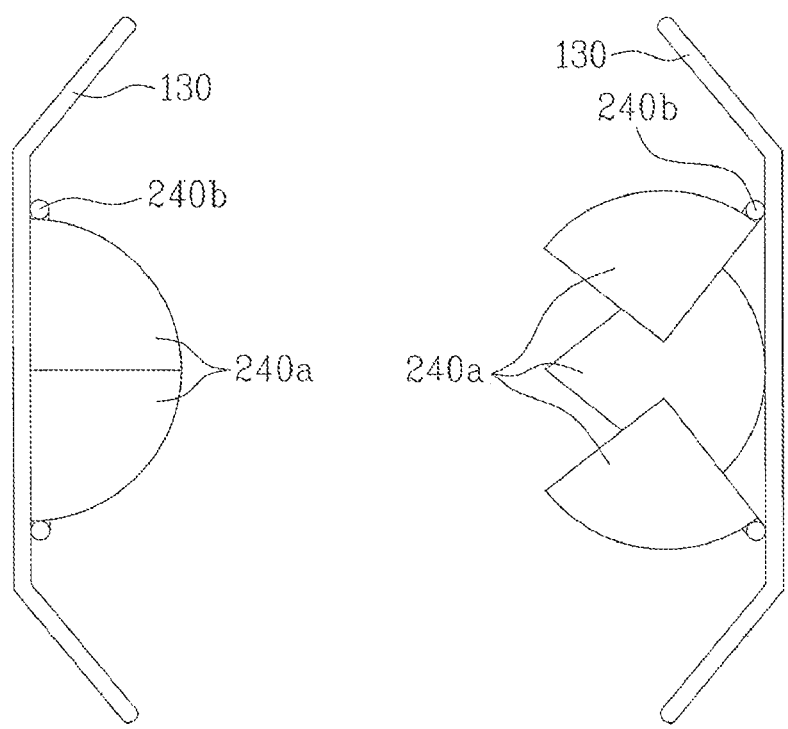
FIG. 4 is a view of a rotor blade to which a hemispherical plate is attached according to a third embodiment of the first scheme of the present invention.

As illustrated in FIG. 4, in the third embodiment unlike the first and the two embodiments, a ball net is not fixed to a wind hole 140 having a circular shape, which is defined in a rotor blade 130, but a hemispherical plate 240 is fixed thereto. The hemispherical plate 240 is empty and provided with three plate wings 240a that are coupled to each other to protrude in one direction. Each of the plate wings 240a is provided with a hinge 240b that fixes the plate wing 240a to the wind hole 140 and functions as a shaft through which opening/closing is performed according to a direction of wind.

In the hemispherical plate 240, when the wind is applied to a protruding portion of the rotor blade 130 disposed at the left of the direction of the wind, the hinge attached to the plate wing and functioning as a shaft does not work so that the wind hole is closed, and when the wind is applied to a recessed portion of the rotor blade 130 disposed at the right of the direction of the wind, the hinge attached to the plate wing and functioning as a shaft works so that the wind hole is opened while the three plate wings are spread from a center.

As all of the rotor blades 130 disposed at the left and the right of the direction of the wind, respectively, rotate in the clockwise direction, the rotor blade 130 disposed at the left is properly functional in a rotation speed of a rotary shaft 120, and the rotor blade 130 disposed at the right is adversely functional in the rotation speed of the rotary shaft 120. Accordingly, the hemispherical plate 240 attached to the wind hole of the rotor blade maximize a different in pressure between the two blades to increase the rotation speed of the rotary shaft 120.

A fourth embodiment of the first scheme of the present invention will be described as follows.

Figure 5:
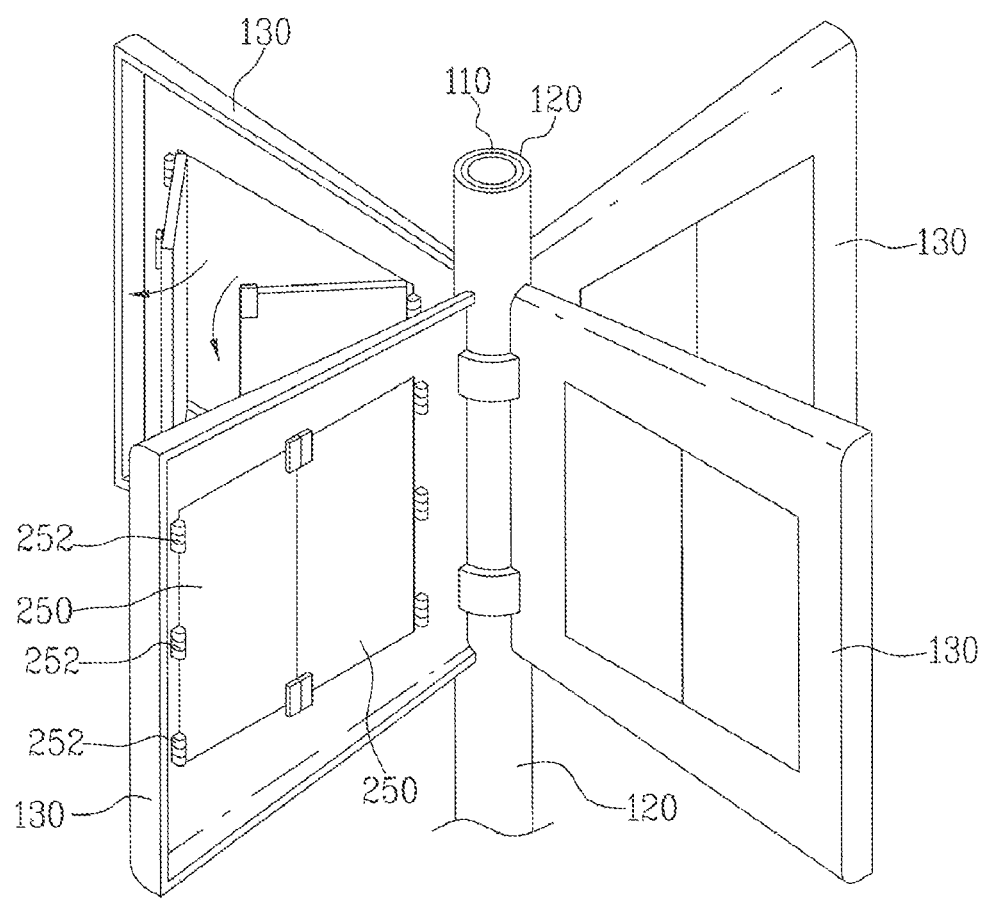
FIG. 5 illustrates a rotor blade of a vertical axis wind turbine generator connected to a rotary shaft according to a fourth embodiment of the first scheme of the present invention.

As illustrated in FIG. 5, a rotor blade 130 is fixed to a rotary shaft 120, and a wind hole 140 having a quadrangular shape is defined in the rotor blade 130 unlike the embodiments described above. A pair of wind hole opening/closing doors 250, which are opened only in one direction and also opened toward both sides on the basis of a center thereof, are installed in the wind hole 140.

The wind hole opening/closing doors 250 are coupled to the inside of one side surface of the wind hole 140 through hinges so as to be opened only in one direction, and a spring is embedded in each of the hinges so that the wind hole opening/closing doors 250 are elastically restored only in one direction.

Opening prevention pins 251, which are disposed on an outer circumference of the wind hole 140 to restrict backward opening of the wind hole opening/closing doors 250, are fixed to inner upper and lower ends of the pair of the wind hole opening/closing door 250, respectively, so that the backward opening is restricted, and only forward opening is allowed.

As above, due to the wind hole opening/closing doors 250, like each of the embodiments described above, when the rotor blade is disposed at the left of a direction in which wind blows on the basis of the rotary shaft 120, the wind hole 140 is closed so that a wind pressure as much as the entire area of the rotor blade 130 is applied to the rotor blade. When the rotor blade is disposed at the right, the wind hole 140 is opened so that the wind pressure as much as an area of the rotor blade 130 excluding the wind hole 140 is applied to the rotor blade. Accordingly, the rotation speed is increased due to a difference between the wind pressures acting on the rotor blades.

Figure 6:
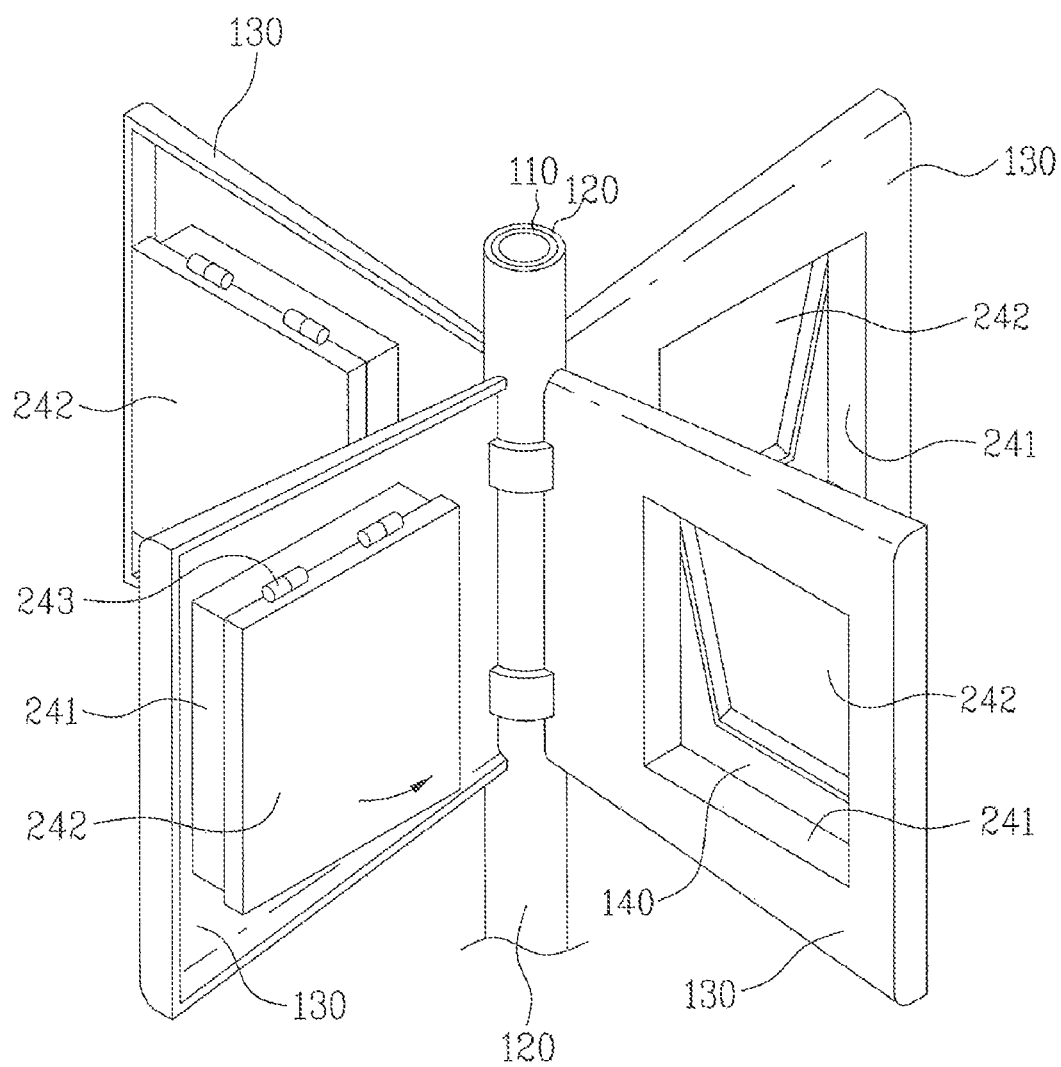
FIG. 6 illustrates a rotor blade of a vertical axis wind turbine generator connected to a rotary shaft according to a fifth embodiment of the first scheme of the present invention.

In FIG. 6, as a fifth embodiment of the first scheme, a wind hole having a quadrangular shape is defined in a rotor blade 130 like the fourth embodiment, but a quadrangular wind hole can 241 having the same size as the quadrangular wind hole is fixed to the wind hole. The quadrangular wind hole can 241 has a small width, and the width thereof is made to be greater than a width of a rotor blade frame so that one end of the quadrangular wind hole can 241 is provided to protrude from an inner surface of the rotor blade 130 when the quadrangular wind hole can 241 is fixed to the wind hole of the rotor blade. An air blocking film 242 is attached to an inlet of the quadrangular wind hole can, which protrudes, to have a shape that blocks the wind hole.

An air blocking film hinge 243 that functions as a shaft is provided on an upper portion of the air blocking film so that when the attached rotor blade 130 rotates, the air blocking film 242 is opened or closed according to a direction of wind.

In the air blocking film 242 attached as above, like the first and second embodiments, as the rotor blade is set to rotate in the clockwise direction, the rotor blade disposed at left surfaces of a rotor blade ② and a rotor blade ④ parallel to the direction of the wind is properly functional in rotation of a rotary shaft 120, and the rotor blade disposed at right surfaces thereof is adversely functional.

When the rotor blade is properly functional, the air blocking film 242 is not opened to increase a wind pressure, and when the rotor blade is adversely functional, the air blocking film 242 is opened to decrease a wind pressure, so that the rotary shaft 120 is rotated in the clockwise direction.

A sixth embodiment of the first scheme of the present invention will be described as follows.

Figure 7:
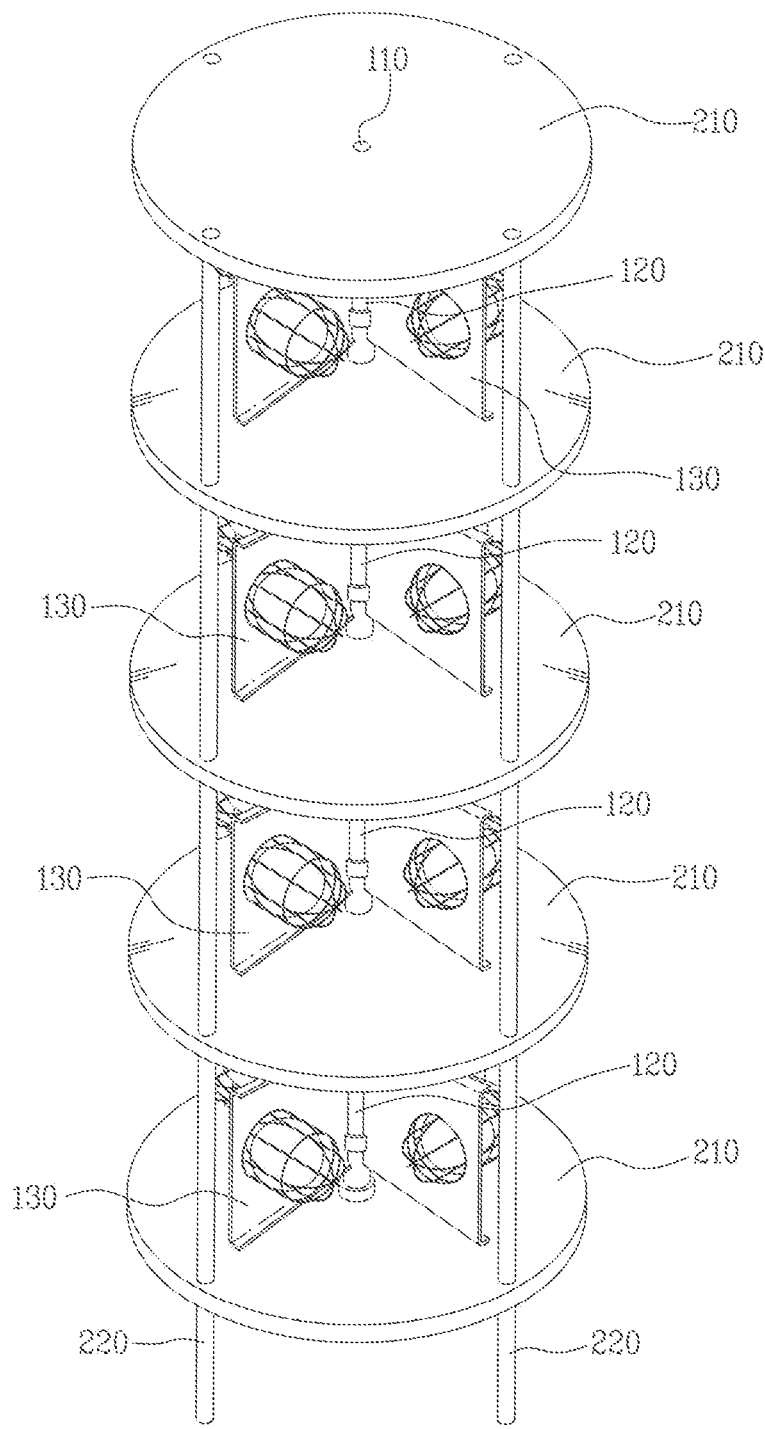
FIG. 7 is a side view of a vertical axis wind turbine generator provided as a multi-stage type according to the present invention.
Figure 8:
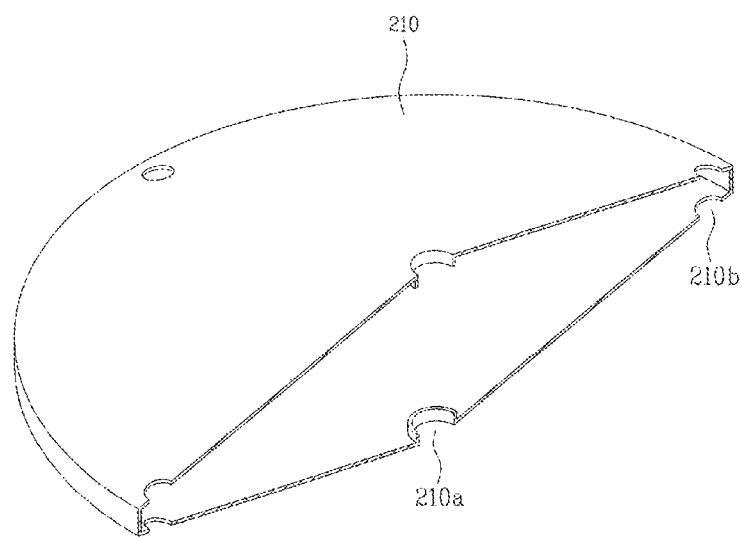
FIG. 8 is a cross-sectional view of wind guide plates through which four poles of a vertical axis wind turbine generators pass and which are installed at fixed intervals according to the present invention.
Figure 9:
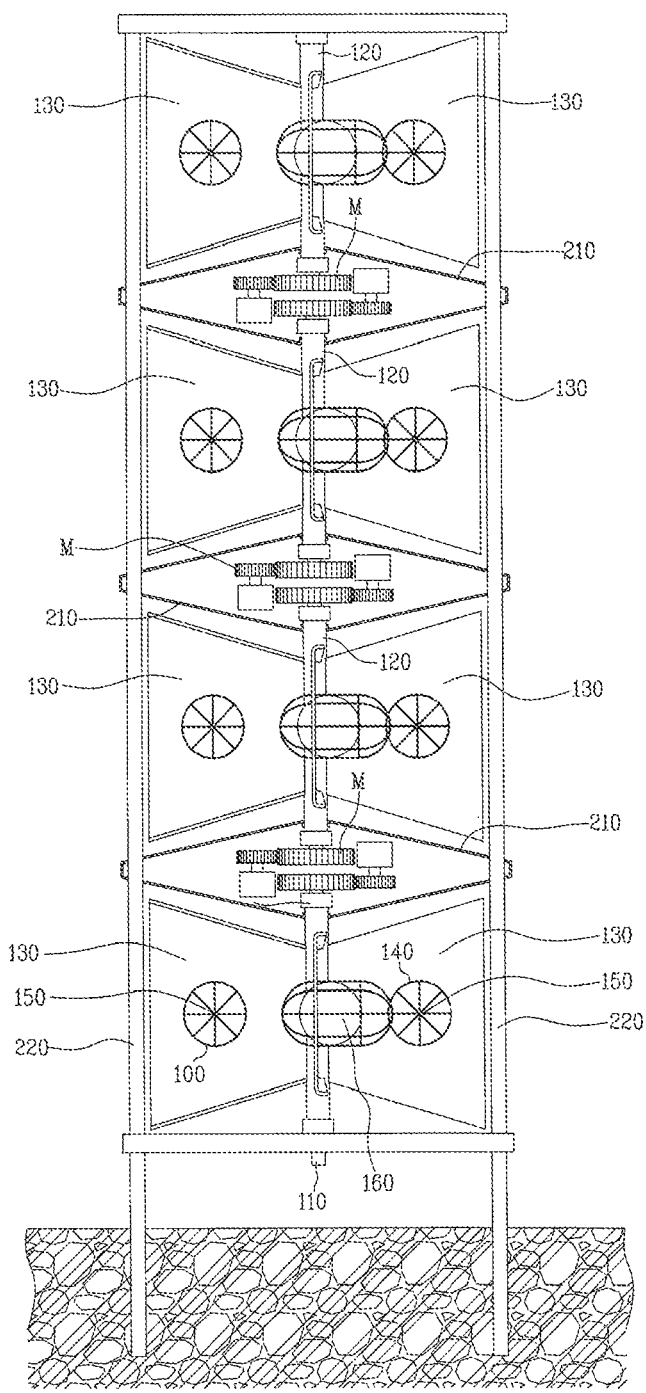
FIG. 9 is a cross-sectional view of a vertical axis wind turbine generator provided as a multi-stage type according to the present invention.

As illustrated in FIGS. 7, 8, and 9, four rotary shafts 120 are coupled as rotary shafts to a stationary shaft 110. Four poles 220 are built at positions spaced a predetermined distance from each other in a circumferential direction around the stationary shaft 110. Respective central points of the poles 220 are connected as one line so that the line has a square shape or a rectangular shape when viewed on a plane.

Five wind guide plates 210 each having a cone shape are provided at fixed intervals in the poles 220. An outer circumference of each of the wind guide plates 210 is coupled to the poles 220, which are fixed to the ground at an interval of about 90°, to provide a shape like tower as a whole. As each of the wind guide plates 210 is supported in four regions, force is distributed even when the wind pressure is applied to the wind guide plates 210. Accordingly, the wind guide plates 210 are very stable structurally compared to when the pole 220 is provided in one.

As illustrated in FIG. 8, a rotary shaft hole 210a into which each of the rotary shafts 120 is inserted is defined in a center of the wind guide plate 210, and the wind guide plate 210 has a conical cross-section and is empty. The wind guide plate 210 has an inclination inclined at an angle of about 5 degrees to about 30 degrees at an upper side, and an inclination inclined at an angle of about −5 degrees to about −30 degrees at a lower side, on the basis of a horizontal plane. The greater the tilt angle is, the greater a difference in height between a central portion and a circumferential portion is, and the smaller tilt angle is, the smaller the difference in height between the central portion and the circumferential portion is.

The rotary shaft 120 is rotatably coupled to the stationary shaft 110 between the wind guide plate 210 and the wind guide plate 210. As the wind guide plates 120 are five, the rotary shaft 120 are provided in four.

Like the first embodiment, the rotary shaft 120 is provided with a rotor blade 130, a wind hole 140, a ball net frame 152, and a wind hole opening/closing ball 160, which have the same structures as those of the first embodiment.

The rotary shaft 120 is engaged with a power generating device M, which is provided in the wind guide plate 210 and includes a rotor and a stator, and the power generating device M is operated by the rotation of the rotary shaft 120 to perform power generation.

A seventh embodiment of the first scheme of the present invention will be described as follows.

Figure 10:
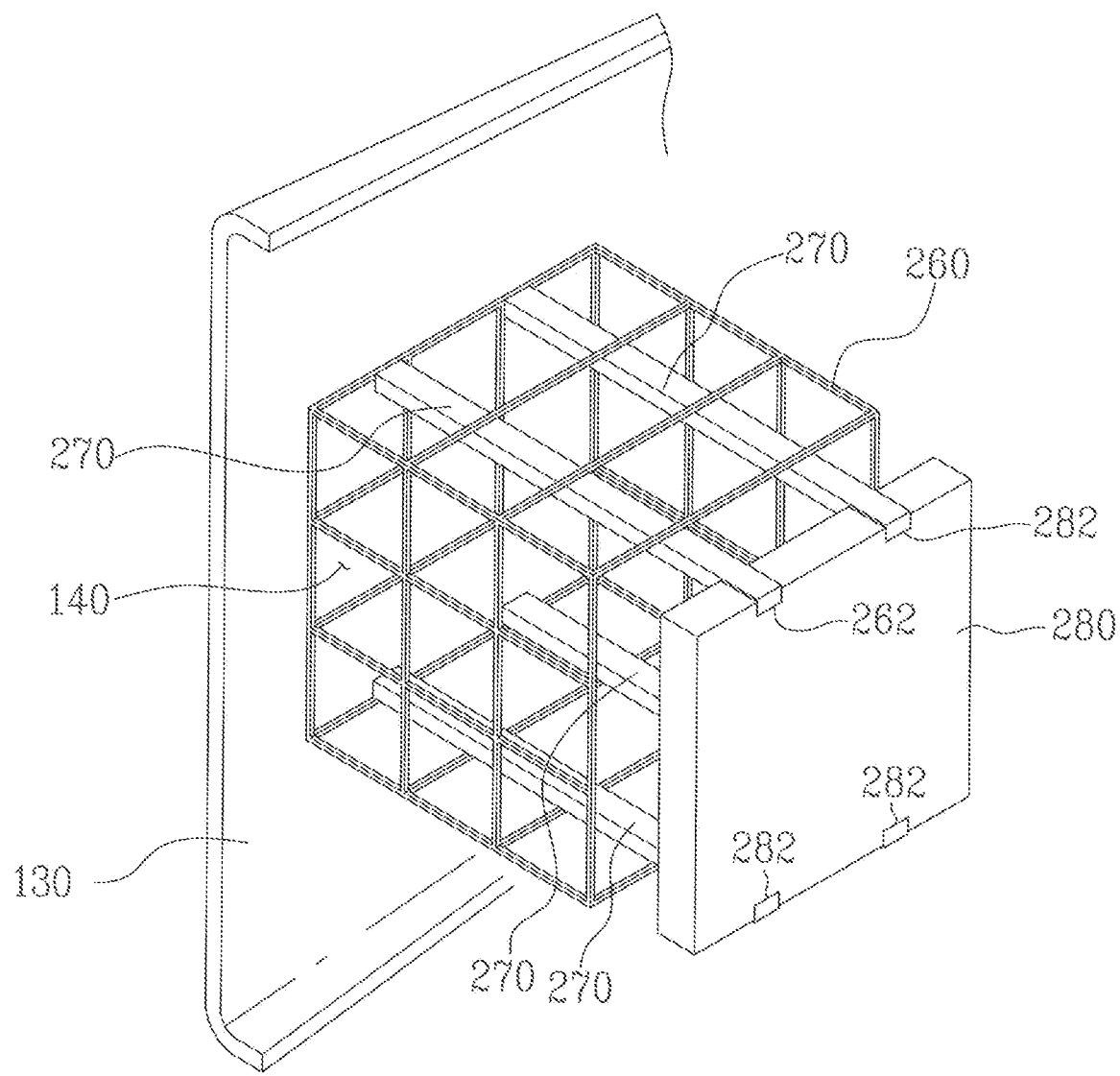
FIG. 10 is a side view of a plate net and a wind hole opening/closing plate that are mounted on a rotor blade according to a seventh embodiment of the first scheme of the present invention.

As illustrated in FIG. 10, a wind hole 140 is defined in a rotor blade 130 fixed to a rotary shaft 120 like the first embodiment, but the wind hole 140 has a quadrangular shape, and a plate net 260 having a hexahedral shape is provided in the wind hole 140. The plate net 260 is made in the form of a hexahedron by connecting a plurality of angles to each other, and compared to an area occupied by the hexahedron, the entire area of the angles is relatively small so that wind is allowed to well pass between the angles.

A pair of plate guide rails 270 are provided on each of inner upper and lower sides of the plate net 260. A wind hole opening/closing plate 280 is coupled to the plate guide rails 270. The wind hole opening/closing plate 280 is a quadrangular plate having the same size as the wind hole 140 so as to completely close the wind hole 140, and a guide groove 282 into which each of the plate guide rails 270 is fitted is defined in each of upper and lower ends thereof. Thus, the plate net 260 is movable while sliding forward and backward along the plate guide rail 270 by the wind.

When wind blows, the wind hole opening/closing plate 280 of a rotor blade 130 disposed at the left of a direction in which the wind blows on the basis of the rotary shaft 120 is moved in an instant by a wind pressure to an end portion of the plate guide rail 270 along the plate guide rail 270 and closes the wind hole 140, and the wind hole opening/closing plate 280 of a rotor blade disposed at the right is moved in an instant by a wind pressure to a front portion of the plate guide rail 270 along the plate guide rail 270 and opens the wind hole 140.

As above, due to the wind hole opening/closing plate 280, like the first embodiment, when the rotor blade 130 is disposed at the left of the direction in which the wind blows on the basis of the rotary shaft 120, the wind hole 140 is closed so that the wind pressure as much as the entire area of the rotor blade 130 is applied to the rotor blade 130. When the rotor blade is disposed at the right, the wind hole 140 is opened so that the wind pressure as much as an area of the rotor blade 130 excluding the wind hole 140 is applied to the rotor blade. Accordingly, the rotation speed is increased due to a difference between the wind pressures acting on the rotor blades.

An eighth embodiment of the first scheme of the present invention will be described as follows.

Figure 11:
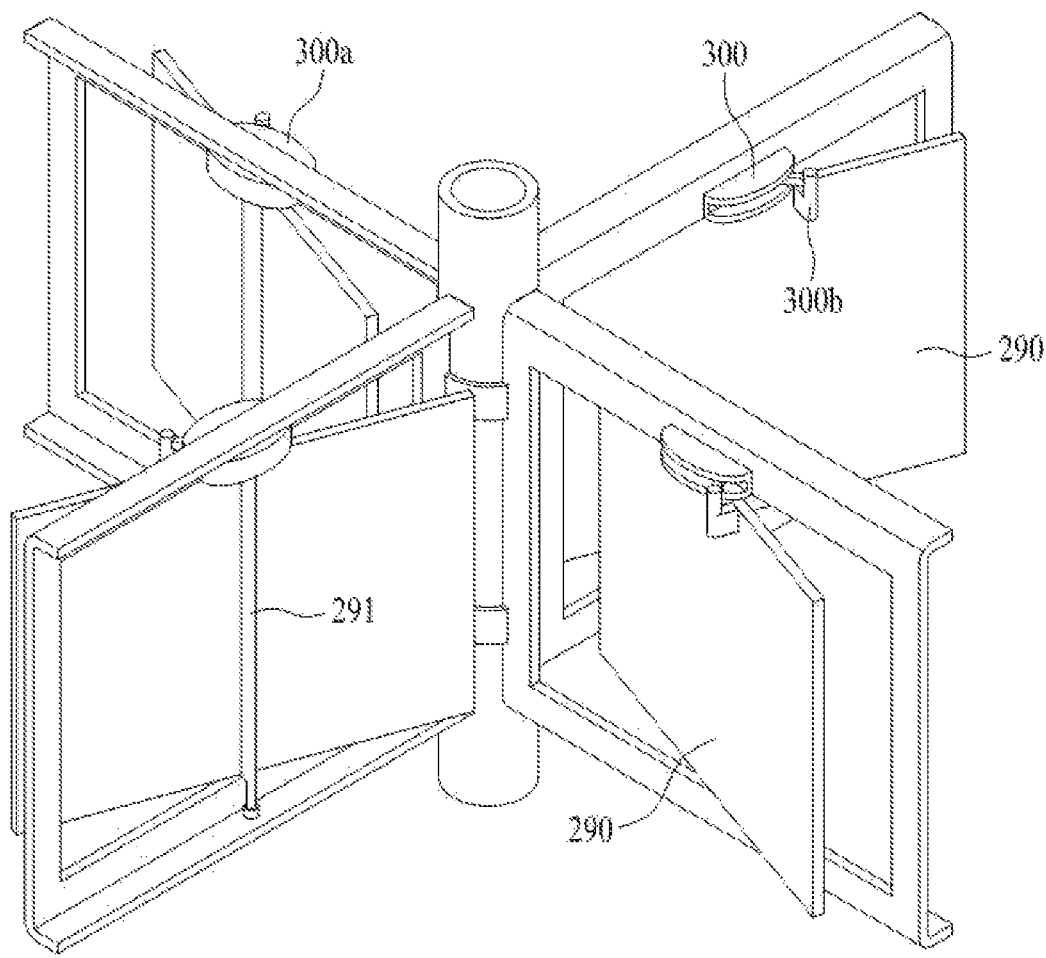
FIG. 11 is a side view of a rotor blade, and a wind hole damper and a wind hole damper actuator that are mounted on a wind hole of the rotor blade according to an eighth embodiment of the first scheme of the present invention.

As illustrated in FIG. 11, a wind hole 140 defined in a rotor blade 130 has a larger size than other embodiments. Most of an area of the rotor blade 130 is provided as a wind hole having a rectangular shape. A damper having the same size and shape as the wind hole is installed in the wind hole 140, and performs functions to open and close the wind hole 140.

The damper installed in the wind hole 140 of the rotor blade 130 as above is referred to as a wind hole damper 290. A rotary shaft 291 is vertically provided at a center of the wind hole damper 290, and upper and lower ends of the rotary shaft 291 are rotatably mounted on central upper and lower inner sides of the wind hole 140 defined in the rotor blade 130, respectively, so that the wind hole damper 290 rotates around the rotary shaft 291 at angles between about 0° to about 90°.

The wind hole damper 290 mounted in the wind hole 140 as above closes the wind hole 140 when the rotor blade 130 is disposed at the left of a direction of wind through a wind hole damper actuator 300, and opens the wind hole 140 when the rotor blade 130 is disposed at the right.

Figure 12:
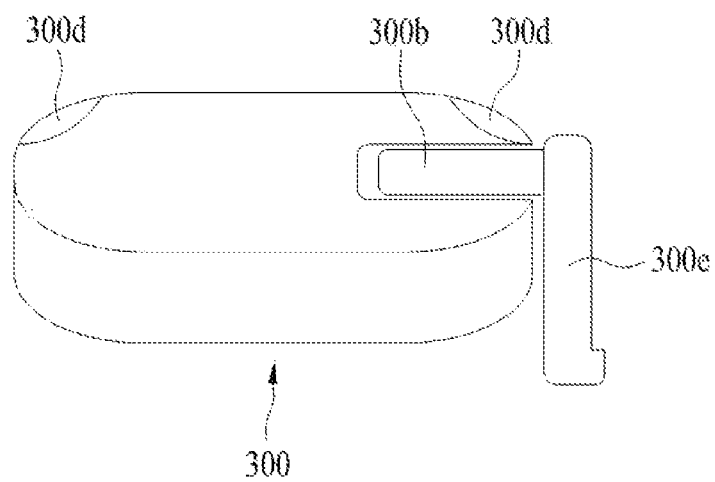
FIG. 12 is a side view of a wind hole damper actuator according to the present invention.
Figure 13:
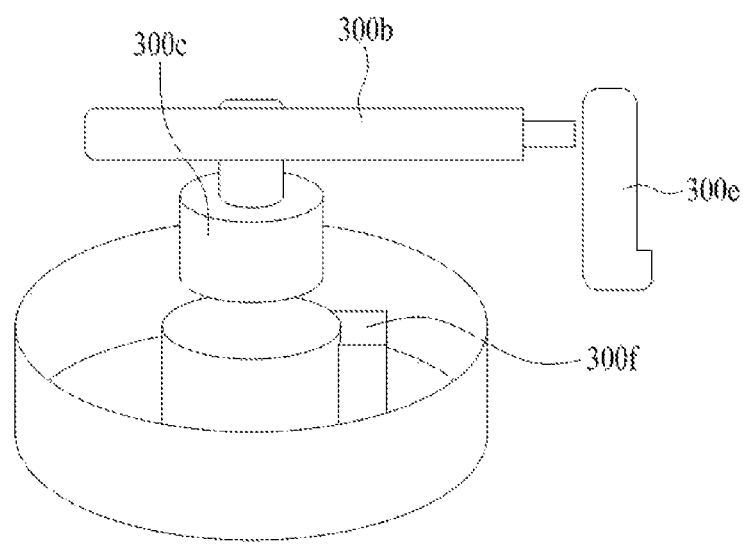
FIG. 13 is an exploded view of a wind hole damper actuator according to the present invention.
Figure 14:
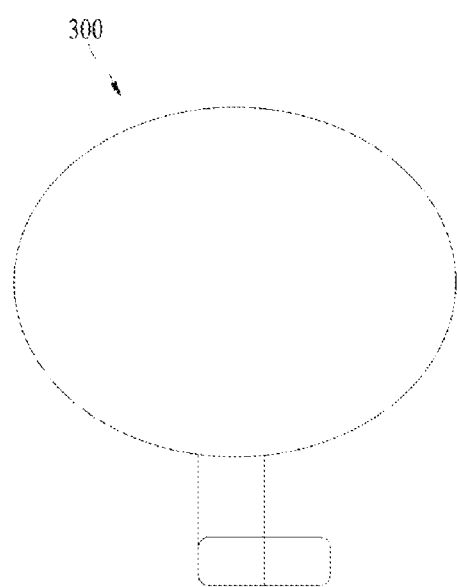
FIG. 14 is a plan view of a wind hole damper actuator according to the present invention.

FIGS. 12, 13, and 14 are a side view, a view illustrating the inside, and a plan view of the wind hole damper actuator 300. The wind hole damper actuator 300 provides power to open and close the wind hole damper 290 mounted in the wind hole 140 of the rotor blade 130.

The wind hole damper actuator 300 includes a wind hole damper actuator case 300a, a wind hole damper actuating bar 300b, a wind hole damper electric motor 300c, a wind sensor 300d, and a power transmission bar 300e.

The wind hole damper actuating bar 300b is connected to the wind hole damper electric motor 300c, which is embedded in the wind hole damper actuator 300 together, and has an end that protrudes to the outside of the wind hole damper actuator case 300a. The power transmission bar 300e is fixed to the end protruding to the outside, and an end of the power transmission bar 300e is fixed to one upper side surface of the wind hole damper 290 so that actuating force of the wind hole damper actuating bar 300b is transmitted to the wind hole damper 290 to close or open the wind hole 140.

An operation of the wind hole damper electric motor 300c is controlled through the wind sensor 300d, which detects wind power, and an operational module 300f, and the wind sensor 300d is mounted on each of the front and rear of the wind hole damper actuator case 300a.

Operations of the eighth embodiment will be described as follows.

A higher wind pressure is applied to the rotor blade ① of the rotor blades 130, which is at the left on the basis of a direction of wind and in a state of perpendicularly crossing the direction of the wind, and the rotor blade ③ of the rotor blades 130, which is disposed at the right and in a state perpendicularly crossing the direction of the wind. The rotor blades ② and ④ of the rotor blades 130 are provided in a line in the same direction as the direction of the wind, and thus a lower wind pressure is applied thereto.

In the wind hole damper actuator case 300a installed on a central upper portion of the rotor blade ① of the rotor blades 130, the wind is applied to a rear surface thereof so that the wind sensor 300d mounted on the rear surface operates to allow the wind hole damper 290 to close the wind hole 140 of the rotor blade 130. In the wind hole damper actuator case 300a installed on a central upper portion of the rotor blade ③ of the rotor blades 130, the wind is applied to a front surface thereof so that the wind sensor 300d mounted on the front surface operates to allow the wind hole damper 290 to open the wind hole 140.

Therefore, ① of the rotor blades 130 generates the maximum power of the backwind, and the rotor blade ③ of the rotor blades 130 generates the minimum power of the headwind so that the rotary shaft 120 generates the maximum torque.

The rotor blade ② of the rotor blades 130 and the rotor blade 44 of the rotor blades 130 are provided in a row with the direction of the wind, and thus no wind pressure or a low wind pressure is applied thereto. Accordingly, the wind sensor 300d mounted in the wind hole damper actuator case 300a does not operate so that an angle basically set between the rotor blade 130 and the wind hole damper 290 does not change and is maintained as it is.

The above description is provided by acquiring one short time point. As the rotary shaft 120 continuously rotates, changes in respective positions of the rotor blades 130 continue and are repeated.

As the rotary shaft 120 is set to rotated in the clockwise direction, the rotor blades 130, which are disposed at the left and the right on the basis of the direction of the wind and to which the high force of the wind is applied, are disposed perpendicular the direction of the wind, and, for convenience of explanation, are distinguished from the rotor blades 130 that are disposed parallel to the direction of the wind, and thus are not affected or less affected by the force of the wind.

Embodiments of a second scheme of the present invention will be described as follows.

The embodiments of the first scheme described above are related to a power generation scheme in which the wind turbine generators are installed on the land such as mountainous areas or islands, to which a significant amount of wind is applied, to generate electricity, but the second scheme is a power generation scheme in which the wind turbine generators are installed on the sea near or remoted from the coast, to which a significant amount of wind is applied, to generate power.

A power generation facility according to the second scheme installed on the sea, power generation procedures or processes, or the like are the same as the embodiments of the first scheme, but requires an underwater floating body 310 due to the characteristic of the power generation facility that is installed not on the land but on the sea in a floating manner.

Figure 15:
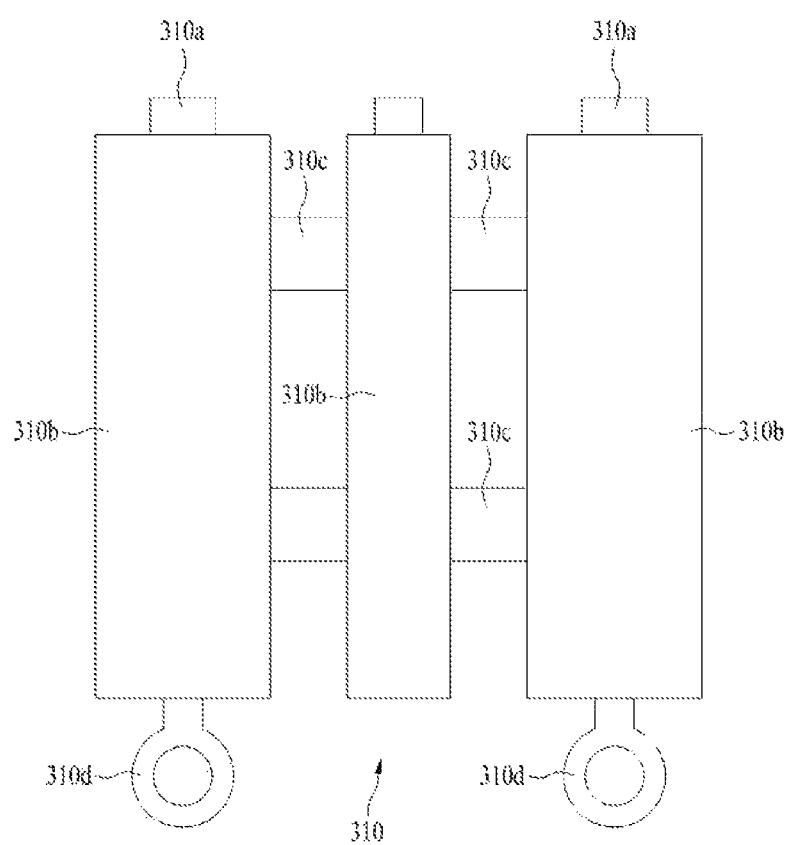
FIG. 15 is a cross-sectional view of an underwater floating body according to the present invention.
Figure 16:
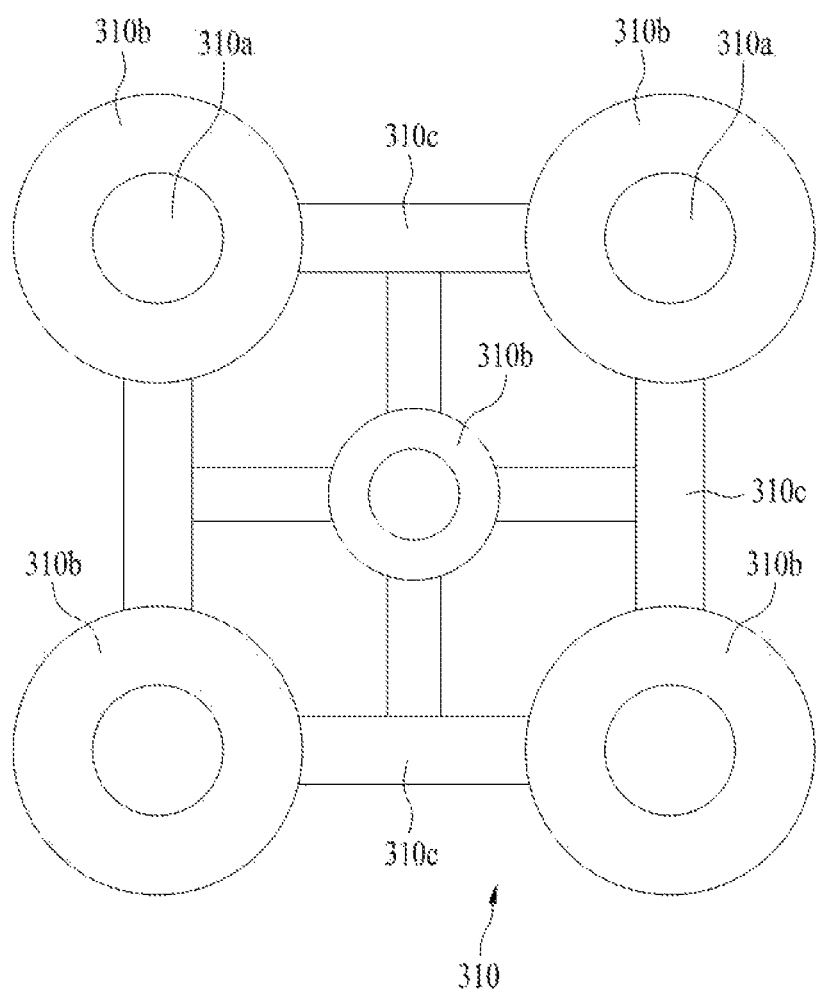
FIG. 16 is a plan view of an underwater floating body according to the present invention.

FIGS. 15 and 16 are a cross-sectional view and a plan view of the underwater floating body 310.

The underwater floating body 310 is empty and sealed, and includes four cylindrical floating body connecting frames 310c, each of which has an elongated cylindrical shape and which are installed at fixed intervals in four directions, an underwater floating body connecting ring 310d, which is provided on a lower end of a cylindrical floating body 310b and is ring-connected through an underwater floating body connecting bar 311 protruding upward after being drilled in the sea bottom, and an underwater floating body pole connecting frame 310a which is provided on an upper portion of the cylindrical floating body 310b and allows a power generation facility pole 220 to be seated and connected.

The underwater floating body 310 is empty and sealed, and is floated on the surface of the sea through buoyant force of the four cylindrical floating body connecting frames 310c, each of which has an elongated cylindrical shape, so as to seat, fix, and connect the power generation facility like each of the embodiments of the first scheme.

As the underwater floating body 310 is in a state of floating in the water as above, vertically standing thereof is incomplete. Thus, the underwater floating body 310 is possible to vertically stand by being fixed through four underwater floating body connecting bars 311, which are separately drilled in the sea bottom to protrude upward.

An end of each of the underwater floating body connecting bars 311 is provided in the form of a ring, and thus is capable of being connected or separated.

Figure 17:
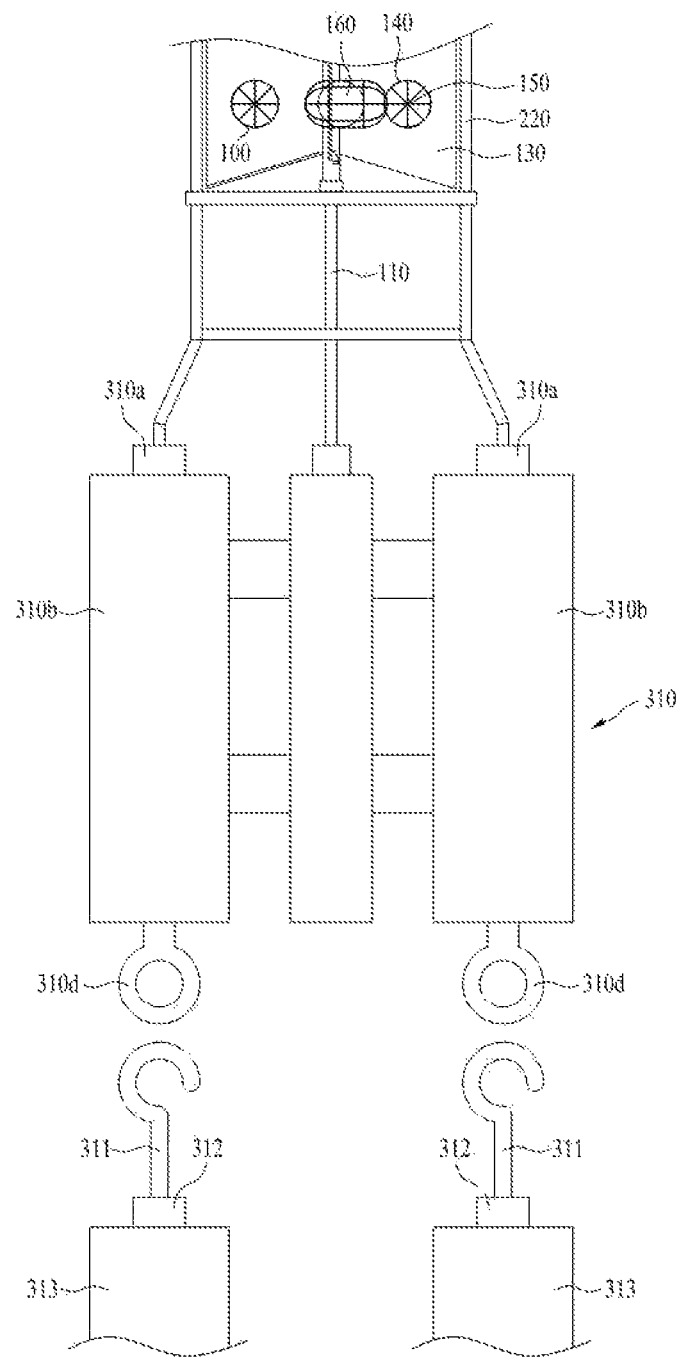
FIG. 17 is a view of a configuration in which a power generation facility is connected to an underwater floating body.

FIG. 17 is a cross-sectional view of a configuration in which the power generation facility of the first scheme is connected to the underwater floating body 310.

The power generation facility is capable of vertically standing and generating power by being fixed through the four underwater floating body connecting bars 311 drilled in the sea bottom to protrude upward.

Operations of the vertical axis wind turbine generator according to each of the embodiments of the present invention configured as above will be described as follows.

When wind blows, the wind is guided while flowing between the wind guide plate 210 and the wind guide plate 210 so that the wind is a little accelerated to be applied to the rotor blade 130. In particular, due to the wind guide plate 210, the wind is concentrated onto the rotor blade 130 without being distributed.

When the wind pressure is applied to the rotor blade 130, like the first embodiment, the wind hole 140 of the rotor blade 130 disposed at the left on the basis of the direction in which the wind flows is closed as the wind hole opening/closing ball 160 moves in an instance along the ball net frame 152 of the ball net 150 so that the wind pressure is applied to the entire area of the rotor blade 130 to generate the torque. In contrast, the wind hole 140 of the rotor blade 130 disposed at the right is opened as the wind hole opening/closing ball 160 moves in an instance along the ball net frame 152 of the ball net 150 so that the wind pressure as much as an area of the rotor blade 130 excluding the wind hole 140 is applied to the rotor blade 130, and thus the wind pressure of the headwind acts on the rotor blade 130. Accordingly, the rotary shaft 120 rotates relatively faster compared to when the wind hole 140 is not defined.

When the rotary shaft 120 rotates, the power generating device M, which is engaged with each of upper and lower ends of the rotary shaft 120 and include a rotor and a stator, is driven to produce electricity.

As the vertical axis wind turbine generator is manufactured as a multi-stage type, and thus include four individual power generators, the entire amount of power generation is four times an amount produced by an individual power generator. As above, the individual power generators are stacked in the form of a tower so that as the number of the individual power generators increases, the amount of electricity production is increased.

The main issue for increasing the number of the individual power generators is whether to withstand the wind pressure applied to the entirety of the power generators. As not only the center of the wind guide plate 210 but also four regions of the outer circumference of the wind guide plate 210 are fixed through the poles, when a wind pressure acts, the wind pressure is distributed to each of the poles. In addition, as the wind guide plate 210 is provided as one body and has a cone shape, when external force (wind pressure) acts, the wind guide plate 210 may not be bent or twisted, and thus well withstand the wind pressure.

In the eighth embodiment, most of the rotor blade 130 is provided as the wind hole having a rectangular shape, and the wind hole damper 290 having the same size and shape as the wind hole is provided in the wind hole 140. Thus, when the rotor blades 130 at the left and the right on the basis of the direction of the wind are disposed at positions perpendicularly crossing the direction of the wind, the wind sensor 300d is operated through a program set in the operational module 300f so that the wind hole damper 290 is allowed to close or open the entirety of the wind hole 140. Accordingly, backwind power sensitivity for the rotor blade 130 is increased to the maximum, and headwind power sensitivity is minimized to maximize the torque of the rotary shaft 120.

According to the present invention, the wind hole is defined in the rotor blade, and the wind hole is allowed to be opened or closed according to the direction of the wind so that the wind hole is opened when the rotor blade is disposed at the position of being accelerated on the basis of the direction in which the wind blows, and in contrast, the wind hole is closed when the rotor blade is disposed at the position of being decelerated. Accordingly, the speed of the rotary shaft to which the rotor blade is fixed is relatively increased compared to when the wind hole is not defined.

In addition, as the one power generator including the stationary shaft, the rotor blade, the rotary shaft, and the power generating device is provided as the multi-stage type like the tower, the much wind power may be obtained in the same space, and although stacked in the multiple stages, the power generators are structurally more stable, the structural stability of the power generators may be secured even against the high wind pressure.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A vertical axis multi-stage wind turbine generator comprising:
   a stationary shaft (110) built vertically;
   a rotary shaft (120) coupled to the stationary shaft (110) in multiple stages;
   at least two rotor blades (130) coupled to the rotary shaft (120);
   a wind hole (140) defined in each of the rotor blades (130);
   a ball net (150) provided on the rotor blade (130) so as to communicate with the wind hole (140) and protrude from both sides of the wind hole (140);
   a wind hole opening/closing ball (160) which is inserted into the ball net (150) and slidable by a wind pressure, wherein in a case in which the rotor blade (130) rotates, when a forward wind pressure acts, the wind hole opening/closing ball (160) slides toward the wind hole (140) to close the wind hole (140), and when a reverse wind pressure acts, the wind hole opening/closing ball (160) slides in an opposite direction to the wind hole (140) to open the closed wind hole (140); and
   a power generating device (M) engaged with the rotary shaft (120) to generate electricity.

2. A vertical axis multi-stage wind turbine generator comprising:
   a stationary shaft (110) built vertically;
   a rotary shaft (120) coupled to the stationary shaft (110) in multiple stages;
   wind guide plates (210) coupled to the stationary shaft (110) in multiple stages;
   a pole (220) which is built vertically and coupled to the wind guide plates (210), and reinforces a structure of the stationary shaft (110) so that the stationary shaft (110) withstands even a high wind pressure without collapsing;
   a rotor blade (130) which is provided in at least two to be coupled to the rotary shaft (120), and is disposed between the wind guide plates (210);
   a wind hole (140) defined in the rotor blade (130);
   a ball net (150) provided on the rotor blade (130) so as to communicate with the wind hole (140) and protrude from both sides of the wind hole (140);
   a wind hole opening/closing ball (160) which is inserted into the ball net (150) and slidable by a wind pressure, wherein in a case in which the rotor blade (130) rotates, when a forward wind pressure acts, the wind hole opening/closing ball (160) slides toward the wind hole (140) to close the wind hole (140), and when a reverse wind pressure acts, the wind hole opening/closing ball (160) slides in an opposite direction to the wind hole (140) to open the closed wind hole (140); and a power generating device (M) engaged with the rotary shaft (120) to generate electricity.

\* \* \* \* \*